Aug. 3, 1954  I. GOODFELLOW  2,685,104
DOUBLE DIE FOR MOLDING HOSIERY AND ANKLE FORMS
Filed July 8, 1950 2 Sheets-Sheet 2

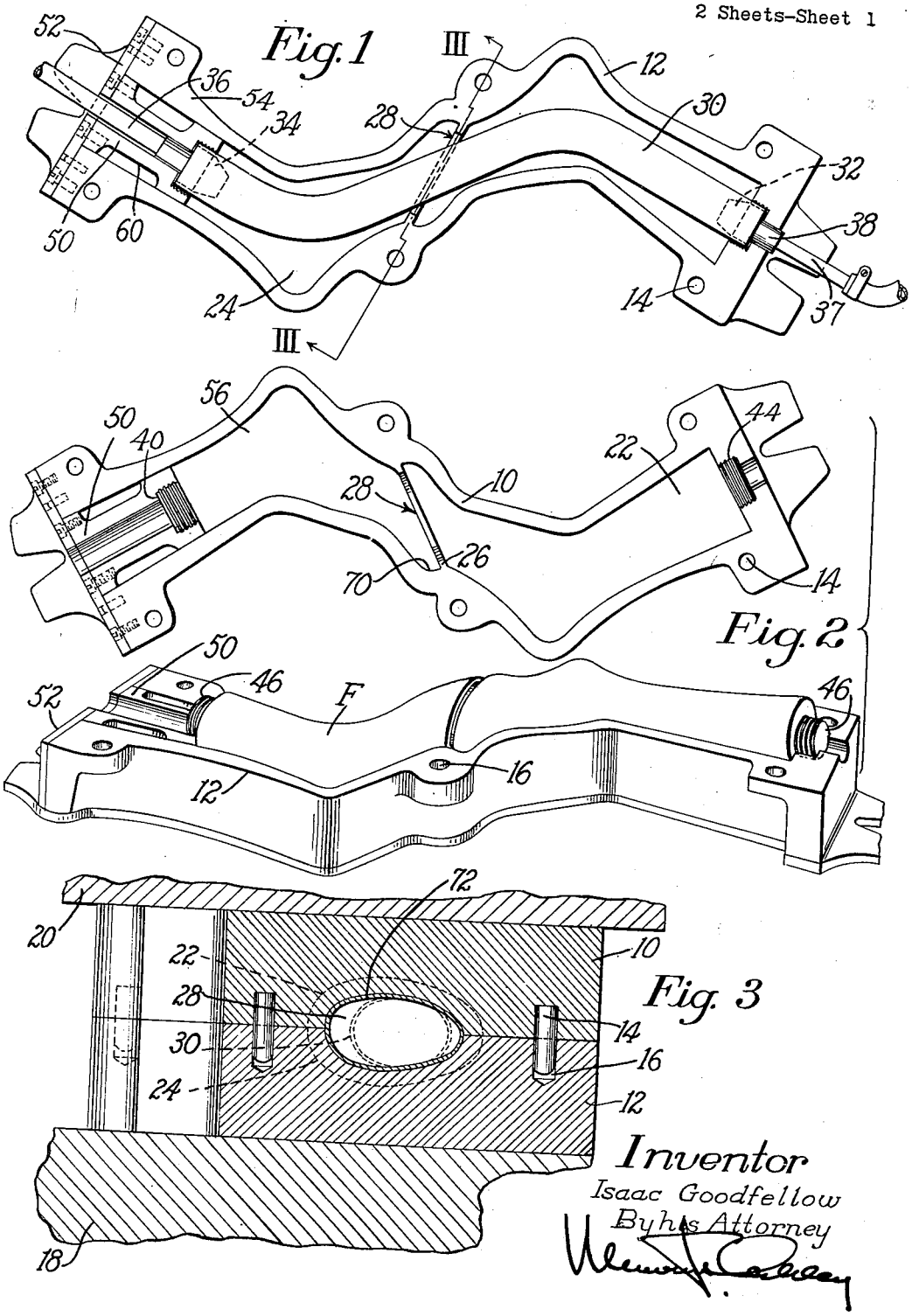

Inventor
Isaac Goodfellow
By his Attorney

Patented Aug. 3, 1954

2,685,104

UNITED STATES PATENT OFFICE 2,685,104

DOUBLE DIE FOR MOLDING HOSIERY AND ANKLE FORMS

Isaac Goodfellow, Auburn, N. Y., assignor to Shoe Form Co. Inc., Auburn, N. Y., a corporation of New York Application July 8, 1950, Serial No. 172,705

2 Claims. (Cl. 18—3)

This invention relates to dies for molding hollow plastic articles and is illustrated as embodied in a multi-cavity die by means of which at least two apparel forms, such as hosiery display and ankle forms, may be molded at a single operation.

The molding of hollow articles by means of a die within which a tubular piece of stock is expanded to fit the die is well known. Such dies have, for example, been utilized advantageously in the production of hosiery forms adapted to be used in show windows for displaying stockings. One particular die is illustrated in Letters Patent of the United States No. 2,029,706, granted February 4, 1936, on the application of William J. De Witt. In the method employed in connection with the patented apparatus a preheated tubular piece of plastic material is inserted in the die and clamped at each end, with the die in closed position. The stock is expanded, to assume the shape of the die, by means of a heated fluid such as air or water under pressure.

In the patented die one end of the tubular stock is clamped directly between the edges of two halves of the die at the foot portion of the form and while this constitutes a satisfactory and eminently successful arrangement, it involves a substantial amount of waste of material at the foot portion.

It will also be understood that a substantial proportion of the total time required for the production of a single form is involved in placing the stock within the die and in clamping the parts of the die together.

One object of the invention is to devise a multi-cavity die construction which will be more economical both with respect to the amount of material employed and with regard to the time required for the production of each form.

This is effected successfully in the multi-cavity die which is herein illustrated and in which a plurality of foot-shaped cavities are embodied in a single die and are arranged foot to foot. The adjacent portions of the successive cavities are bounded by a common partition having an aperture sufficiently large to permit the utilization of a single piece of tubular stock of plastic material so positioned that it will traverse all the cavities of the die.

An internally projecting rib is formed by the margin of this partition, which rib surrounds the aperture joining the adjacent cavities. By means of this rib, the corners surrounding the end of each form are fully molded and are left intact when the two forms are severed and the surfaces thereof finished.

A feature of the invention resides in the employment of a filler piece shaped externally like the internal contour of a portion of a die cavity and by the employment of which articles of different lengths may be molded in the same die. This filler piece is arranged to hold one end of the stock.

These and other features of the invention will now be set forth in the following specification taken in connection with the accompanying drawings in which.

Fig. 1 is a plan view of the lower half of a two-part die illustrating a piece of tubular stock in position in the die;

Fig. 2 is a perspective view showing the lower half of a die, with a completed form therein, and the upper half of the die slightly separated therefrom as it would be in the opening of the die;

Fig. 3 is a transverse section of the line III—III of Fig. 1 taken through the rib which surrounds the aperture between two adjacent cavities;

Figure 4:
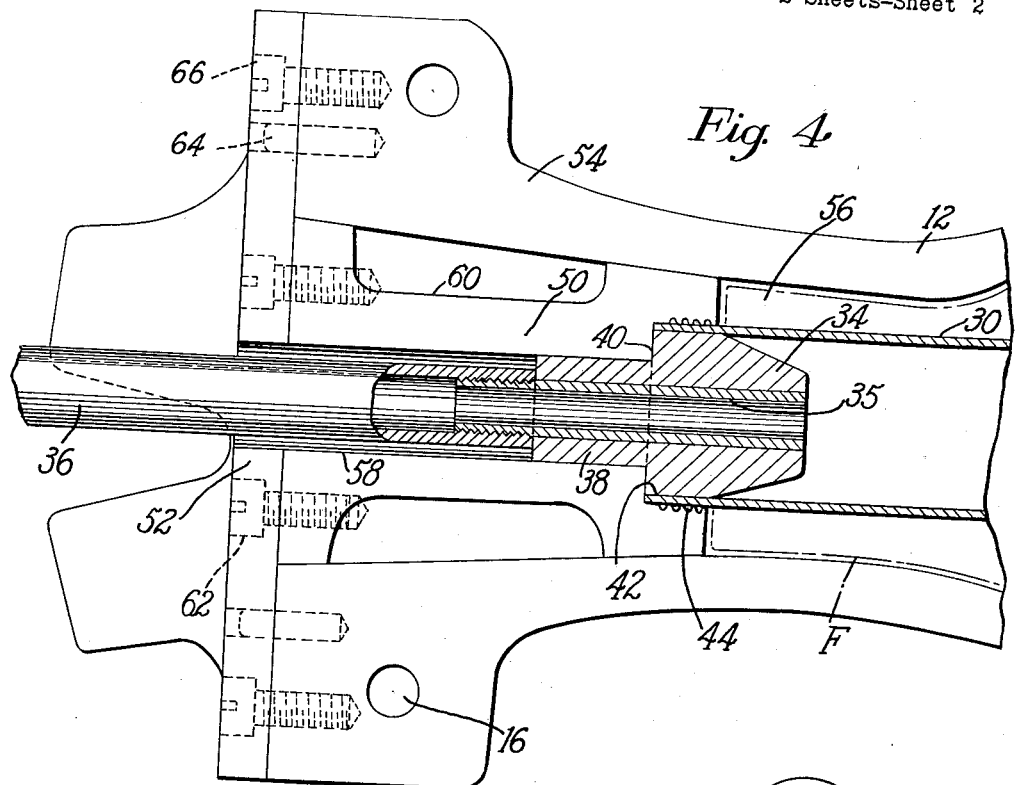
Fig. 4 is a view on a larger scale of an end portion of the die in which a filler piece has been inserted and is utilized in connection with a plug for clamping one end of the tubular stock which is to be expanded to fill the die.

Dies of the type under consideration, and which may be jacketed for heating and cooling, usually comprise an upper half 10 and a lower half 12 which are brought into alinement with one another by means of dowel pins 14 adapted to be inserted in holes 16. The illustrated arrangement does not comprise any clamping device on the two parts of the die itself for the reason that it is intended to be positioned on the bed 18 of a press and held in closed position against the internal pressure of the fluid which is used to expand the form, by the movable platen 20 of this same press. Such a press may conveniently be of the hydraulic type, operated automatically under push-button control, but the only essential is that it shall be able to hold the two halves of the die tightly together.

The halves of these dies are recessed as at 22 and 24 in Fig. 3 and these matching recesses constitute the cavity which determines the external shape of the completed form. In the illustrated die, provision is made for molding two hosiery forms at a single operation and this is accomplished by positioning the recesses in the die with the flat foot portions of the adjacent cavities closely adjacent to one another and separated only by a common partition having a large opening which leaves the margin of the partition in the form of an internally projecting ridge or rib 26. The rib surrounds an aperture 28 interconnecting the adjacent cavities, the aperture being of a size sufficient to permit a single piece of tubular stock material 30 (Fig. 1) to be positioned in the die when it is in soft or flaccid condition. More than two cavities, with connecting apertures may also be arranged to receive a single piece of stock. Although the die which is herein shown has the cavities arranged foot to foot, it will be clear that they may be disposed so as to bring the tops closely adjacent or to position a foot or bottom portion adjacent to the top.

Such a piece of tubular stock material may be expanded to fit the interior surface of the die by clamping the two ends of the stock with the aid of plugs 32, 34 having tubes 35 (Fig. 4) joined to pipe extensions 36, 37 by means of which fluid under pressure may be supplied to the interior of the tubular stock. It will be observed that the plugs 32, 34 each have a reduced neck portion 38 thus leaving a shoulder which abuts the bottom 40 of a socket in the die in such a way as to resist outward movement of the plug under the internal pressure of the expanding fluid. The tubular stock is gripped between the circumference of a cylindrical portion 42 of the plug and the serrated or grooved wall 44 of an adjacent socket. Hence the wall of the socket is recessed by these grooves to provide shoulders against which the end portions of the tubular material are expanded and are thus held against retraction into the cavities. This leaves a neck portion 46 (Fig. 2) on the completed form from which the plug may be removed by an endwise movement but, if there is any sticking of the plug in the form the possible breaking of this neck portion 46 is of no consequence because in most cases it is removed by trimming, in finishing the form.

The illustrated die is so arranged that the plug 32 at the right side of Figs. 1 and 2 is associated directly with the end of the die itself while at the left of these figures a two-part filler piece 50 has been inserted between an end cover 52 and the body 54 of the die so as to make a shorter form in the left-hand cavity 56. This filler piece, divided in halves as is the die, has its outer periphery shaped to exactly fit the internal contour of the upper part of the recess 56, is grooved at 58 (Fig. 4) to give room for the pipe 36 which is secured to the plug 34 and includes a socket against the bottom 40 of which the shoulder of the plug abuts. The bulk of this filler piece is reduced by making an angular recess 60 around it. The filler piece is attached to the end cover 52 by screws 62 and the cover is positioned on and secured to an end of the die by means of dowel pins 64 and retaining screws 66.

Figure 5:
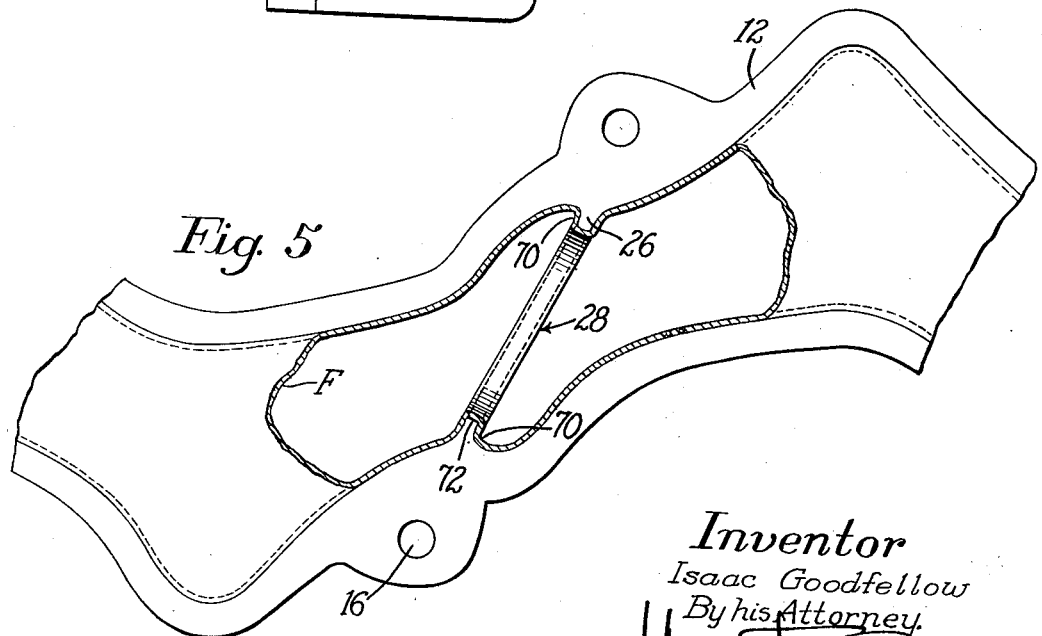
Fig. 5 is an enlarged view of the adjoining portions of a two cavity die with a completed article therein broken away and shown in section at the point where the two forms join each other.

The resulting contour of the adjoining foot portions of the two forms F is well shown in Fig. 5 where it will be seen that the plastic material has been forced into the corners of the die such as that shown at 70 and is wrapped tightly around the rib 36 which surrounds the aperture 28 thus forming a connecting neck 72 which will be cut away after the connected forms have been taken out of the die.

In utilizing dies of the type herein illustrated, the upper half 10 having been removed, a length of tubular stock 30 which has previously been softened, as by heat, is clamped in position in the die by means of plugs such as those shown at 32 and 34. The upper half 10 of the die is then repositioned on the lower half with the assistance of the dowel pins 14 and the die held in closed position by bringing the platen 20 of the press down against its upper surface. Assuming then that the die has been heated, fluid under pressure is admitted to the interior of the tube 30 to expand it into contact with the inner surface of the die. This having been accomplished, the fluid is shut off and cool water applied to chill the die and form and give the form a permanent set. After a suitable cooling interval, the die is opened and the completed dual form put in a chilling tank. Subsequently the neck portions 46 at the outer ends are removed, the two forms are severed and any surplus material on the bottom of the foot portions thereof trimmed away.

Having thus described my invention, what I claim as new and desire to secure by Letters Patent of the United States is:

1. In an apparatus for molding hosiery forms, a die having ends and a form-shaped cavity positioned between them for receiving a piece of tubular stock, a readily removable filler block occupying a substantial portion of the cavity and permitting the molding of a partial form, said block having its periphery shaped substantially to fit and to exclude the stock from the portion of the die which it occupies, means for holding the filler block in the die with the periphery of its inner end fitting against the wall of the cavity, the inner end portion of said filler block having a recessed end, a hollow plug for clamping one end of the tubular stock in said recessed end, means for clamping the other end of the stock in the die, and means for delivering fluid under pressure to the interior of the stock to expand it to fit the die.

2. In an apparatus for molding a plurality of hosiery forms, a die having form-shaped cavities positioned end to end and having an aperture connecting the end portions of the cavities to permit the positioning in the die of a piece of tubular stock extending through the aperture and along the cavities, said die having an inwardly extending ridge around the aperture joining the adjacent cavities, a separable filler block occupying a substantial fraction of the length of one form and having its periphery shaped substantially to fit the walls of the die which it occupies, means for holding the filler block in the die, the inner end of said filler block having a recessed end, a hollow plug for clamping one end of the tubular stock in said recessed end, means for clamping the other end of the stock in the die at the end opposite to that having the plug, and means for delivering fluid to the interior of the stock to expand it to fit the die simultaneously to make one full length form and one having a fractional length.

References Cited in the file of this patent

UNITED STATES PATENTS

| Number | Name | Date |
|---|---|---|
| 965,480 | McDaniel | July 26, 1910 |
| 1,052,081 | Miltner | Feb. 4, 1913 |
| 1,106,625 | Case et al. | Aug. 11, 1914 |
| 1,537,860 | Miller | May 12, 1925 |
| 1,566,903 | Durst | Dec. 22, 1925 |
| 1,624,704 | Adams | Apr. 12, 1927 |
| 1,871,413 | Koch | Aug. 9, 1932 |
| 2,062,767 | Sexton | Dec. 1, 1936 |
| 2,222,461 | De Witt et al. | Nov. 19, 1940 |
| 2,248,898 | Ross et al. | July 8, 1941 |
| 2,449,512 | Scheuer | Sept. 14, 1948 |

FOREIGN PATENTS

| Number | Country | Date |
|---|---|---|
| 15,868 | Great Britain | A. D. 1890 |